United States Patent [19]
Oosaka et al.

[11] Patent Number: 5,247,313
[45] Date of Patent: Sep. 21, 1993

[54] DIRECT COLOR THERMAL PRINTING METHOD AND APPARATUS THEREFOR

[75] Inventors: Shigenori Oosaka; Hitoshi Saito, both of Tokyo, Japan

[73] Assignee: Fuji Photo Film Company, Limited, Kanagawa, Japan

[21] Appl. No.: 850,928

[22] Filed: Mar. 13, 1992

[30] Foreign Application Priority Data

Mar. 15, 1991 [JP] Japan .................................. 3-77003

[51] Int. Cl.$^5$ .......................... B41M 5/26; G01D 9/00
[52] U.S. Cl. .......................... 346/76 PH; 346/76 PH; 346/76 R; 430/148; 430/141; 430/142; 430/146
[58] Field of Search ................. 346/1.1, 76 PH, 76 R; 430/141, 142, 146, 148

[56] References Cited

U.S. PATENT DOCUMENTS

| | | | |
|---|---|---|---|
| 4,734,704 | 3/1988 | Mizutani et al. | 347/76 PH |
| 4,760,048 | 7/1988 | Kurihara et al. | 430/142 |
| 4,771,032 | 9/1988 | Yamaguchi et al. | 430/142 |
| 4,833,488 | 5/1989 | Mizutani et al. | 346/76 PH |

FOREIGN PATENT DOCUMENTS 61-213169 9/1986 Japan .

*Primary Examiner*—Benjamin R. Fuller
*Assistant Examiner*—Huan Tran

[57] ABSTRACT

A direct color thermal printing method records a full-color image containing black characters on a thermosensitive color recording medium having three laminated thermosensitive recording layers. Three color components of each pixel are sequentially read out from three color frame memories. If all of the three color components of a pixel correspond to the maximum densities, that pixel is determined to be printed in black, and is stored as black pixel data in a black line buffer memory. When recording the black pixels, a thermal head is driven to apply a predetermined maximum amount of head energy to the thermosensitive color recording medium, for simultaneously coloring the three thermosensitive recording layers in accordance with the black pixel data. The black pixel recording may be performed simultaneously with recording a first color frame of the image in a first of the three thermosensitive recording layers which is colored first by applying heat energy of the lowest range when the three thermosensitive recording layers are sequentially developed for recording pixels other than the black pixels.

18 Claims, 9 Drawing Sheets

FIG. 3A

| Y1 | Y2 | Y3 | Y4 | Yi | Yn |
|----|----|----|----|----|----|
| M1 | M2 | M3 | M4 | Mi | Mn |
| C1 | C2 | C3 | C4 | Ci | Cn |

| B1 | B2 | B3 | B4 | Bi | Bn |
|----|----|----|----|----|----|

28

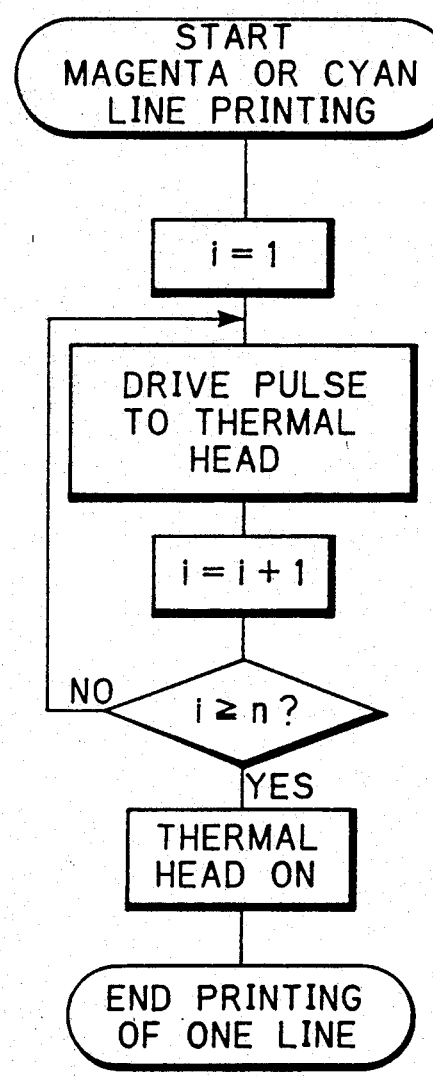

DIRECT COLOR THERMAL PRINTING METHOD AND APPARATUS THEREFOR

BACKGROUND OF THE INVENTION

1. Field of the Invention

The present invention relates to a direct color thermal printing method, and more particularly to a direct color thermal printing method wherein black characters are prevented from being blurred. The present invention further relates to a direct color thermal printer for this method.

2. Related Art

A thermosensitive color recording medium has been suggested, for example, in Japanese Laid-open Patent Application 61-213169, and U.S. patent application Ser. Nos. 07/777,080 and 07/779,086, having thermosensitive coloring layers for magenta, cyan and yellow which are laminated or formed on a supporting material in this order from the bottom. When recording a full-color image on this type of thermosensitive color recording medium, a thermal head thermally records a yellow frame of the image in a thermosensitive recording layer which is colored in a yellow color when heated (hereinafter called simply as the yellow recording layer). The recording medium is, thereafter, exposed to light passing through a yellow filter so as to fix the yellow recording layer. Next, a cyan frame of the image is thermally recorded in a thermosensitive recording layer which is colored in a cyan color when heated (hereinafter called simply as the cyan recording layer), and then optically fixed. Finally, a magenta frame of the image is thermally recorded in a thermosensitive recording layer which is colored in a magenta color when heated (hereinafter called simply as the magenta recording layer), and then optically fixed.

Full color images often contain black-colored characters or lines. Because black is reproduced by subtractive mixture of cyan, magenta and yellow, if any of the three color separation frames deviates from a proper position, the black characters are blurred in the above-described conventional color thermal printing method.

OBJECT OF THE INVENTION

In view of the foregoing, an object of the present invention is to provide a direct thermal color printing method, by which black-colored characters are prevented from being blurred.

Another object of the present invention is to provide a direct thermal color printing method, in which black pixels are recorded by a single step.

SUMMARY OF THE INVENTION

To achieve the above and other objects, the present invention first applies a maximum amount of heat energy to the thermosensitive color recording medium so as to record the black pixels by simultaneously coloring all of the three color thermal recording layers.

In this way, the black-colored characters or lines are recorded by a single step, and hence would not be blurred.

BRIEF DESCRIPTION OF THE DRAWINGS

Other objects and advantages of the present invention will become apparent in the following detailed description of the preferred embodiments when read in conjunction with accompanying drawings, wherein:

FIG. 3A is an explanatory view of a line buffer memory for storing a line of each of the three color image data;

FIG. 3B is an explanatory view of a line buffer memory for storing a line of the black image data;

FIG. 8B is a flowchart illustrating the procedure of recording a magenta or cyan image in the first embodiment.

DETAILED DESCRIPTION OF THE PREFERRED EMBODIMENTS

Figure 1:
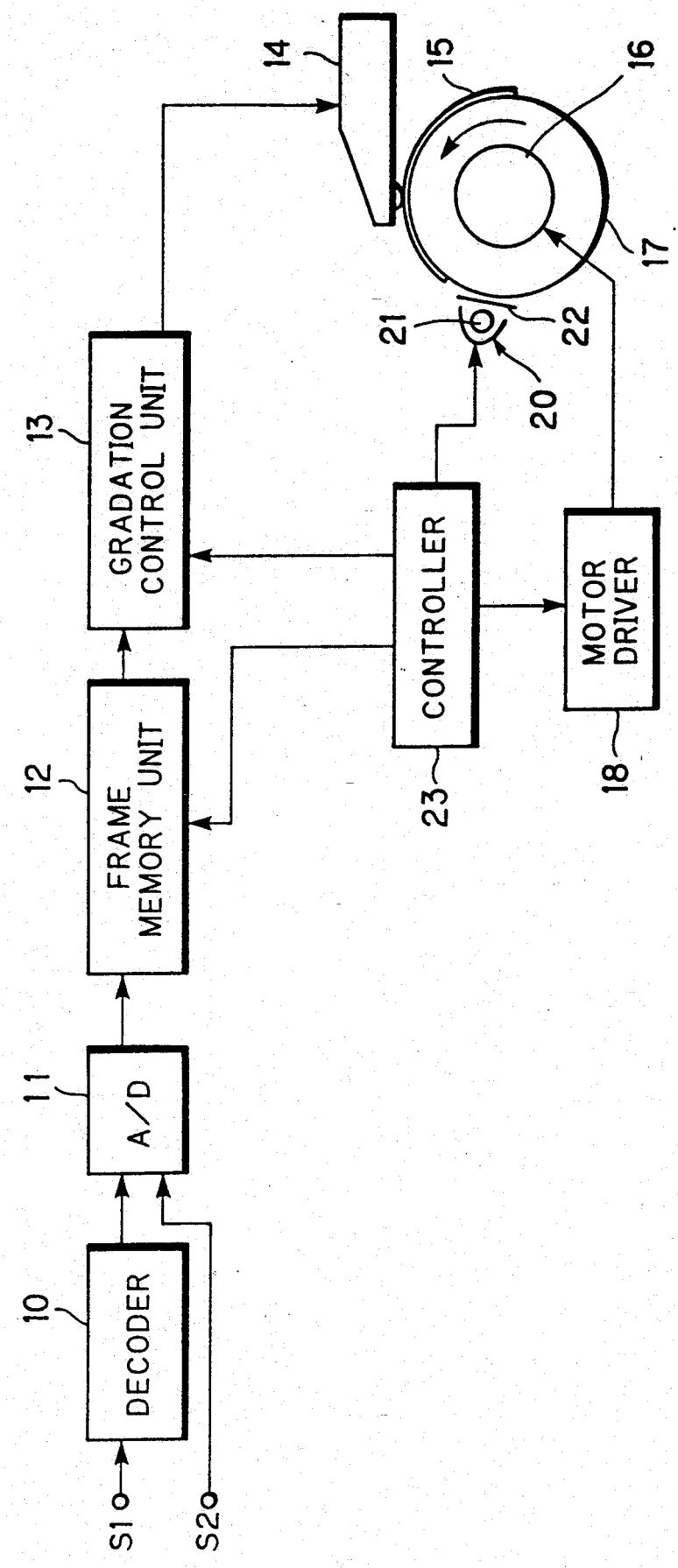
FIG. 1 schematically shows the overall construction of a direct thermal color printer embodying the present invention.

Referring to FIG. 1, a video signal S1 of a color image is separated into blue, green and red signals B, G and R in a decoder 10. The three color separation signals are converted into digital image data for three color image frames in an A/D converter unit 11. The A/D converter unit 11 includes three A/D converters for the three colors. The digital image frame data are stored for each color in three frame memories of a frame memory unit 12.

When black-colored characters are included with the color image, a black character signal S2 of three color separation signals B, G and R each having a same maximum amount is sent to the A/D converter unit 11, after the three color image frame data are written in the frame memory unit 12. The black character signal S2 is then converted into three color digital signals of the same value, which are written in the respective frame memories for each color in the frame memory unit 12. In the case of a color image containing black characters or other colored characters, the image is subjected to the color separation in the decoder 10, in the same way as for other color images that contain no characters.

When recording or printing, the three color image frame data are read out from the frame memory unit 12, line by line for each color, and are sent to a gradation control unit 13, wherein the image line data for blue, green and red are converted into yellow, magenta and cyan image line data, respectively. At the same time, the gradation control unit 13 derives pixels corresponding to the black characters (hereinafter referred to as black image data) from the yellow, magenta and cyan image line data. The black image data as well as three color image line data are temporarily stored and, thereafter, are selectively and sequentially read out to be converted into a number of drive pulses for each pixel and for each color. The drive pulses are applied to a thermal head 14.

The thermal head 14 has an array of heating elements arranged in a primary scanning direction which is perpendicular to a recording medium transporting direction. The number of the drive pulses are determined considering the coloring characteristics of the thermosensitive recording medium 15, such that the heating elements each individually radiate a variable amount of heat energy corresponding to the color density of the pixel to be recorded. It may be possible to control the heat energy of the heating elements by varying the voltage applied to the heating elements, instead of varying the number of drive pulses.

The thermosensitive recording medium 15 is tightly mounted on the periphery of a platen drum 17. The platen drum 17 is rotated by a motor 16 in the recording medium transporting direction (hereinafter referred to as the secondary scanning direction). The motor 16 is driven by a motor driver 18. An optical fixing device 20 includes of an ultraviolet lamp 21 and a slidable sharp cut filter 22. The sharp cut filter 22 is of SC-21, for example, which which allows to transmit light of about 410 nm or more. A controller 23 sequentially controls the respective sections.

Figure 2:
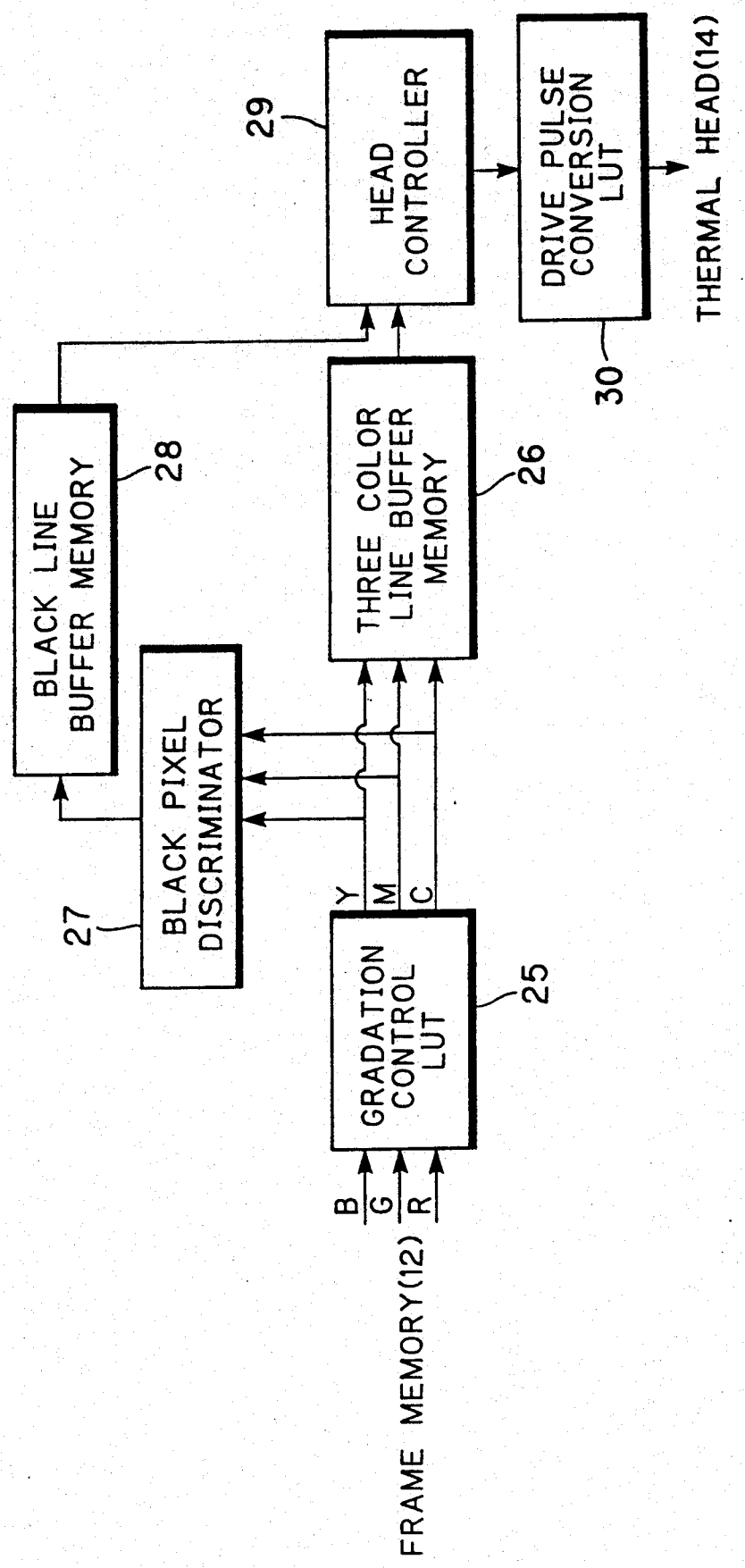
FIG. 2 is a block diagram showing an example of a gradation controller.

FIG. 2 shows an example of the gradation control unit 13. A line of the blue image data, a line of the green image data, and a line of red image data are sent from the frame memory unit 12 to three color look-up table memories of a gradation control look-up table 25 (hereinafter referred to as the gradation control LUT). The blue, green and red image line data are then converted into yellow, magenta and cyan image line data, on the basis of the coloring characteristics of the cyan, magenta and yellow recording layers. The yellow, magenta and cyan image line data are stored in a three color line buffer memory 26, as shown in FIG. 3(A), wherein "Y", "M" and "C" indicate the yellow, magenta and cyan image line data, respectively, whereas the numerals indicate the positions of the pixels in the primary scanning direction.

Figure 6:
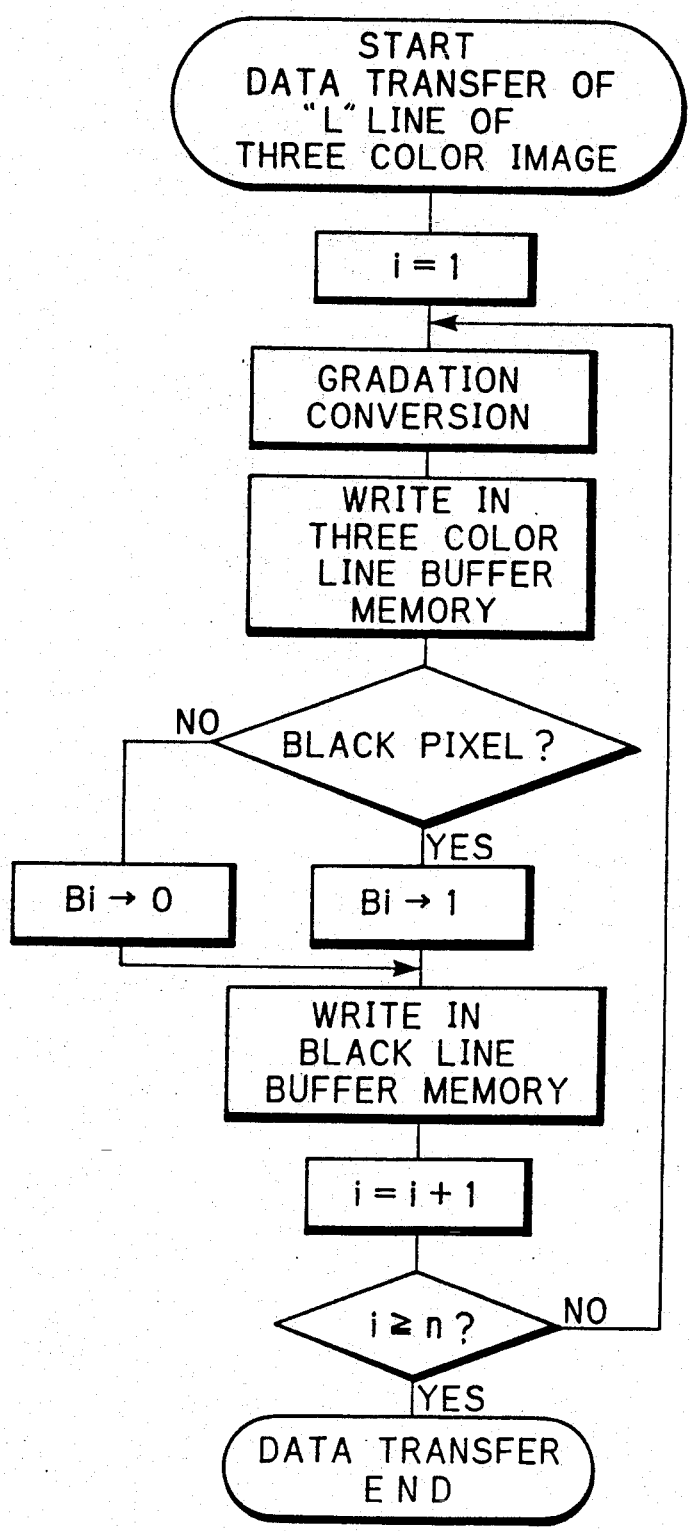
FIG. 6 is a flowchart illustrating the procedure of a data writing into the line buffer memories.
Figure 7:
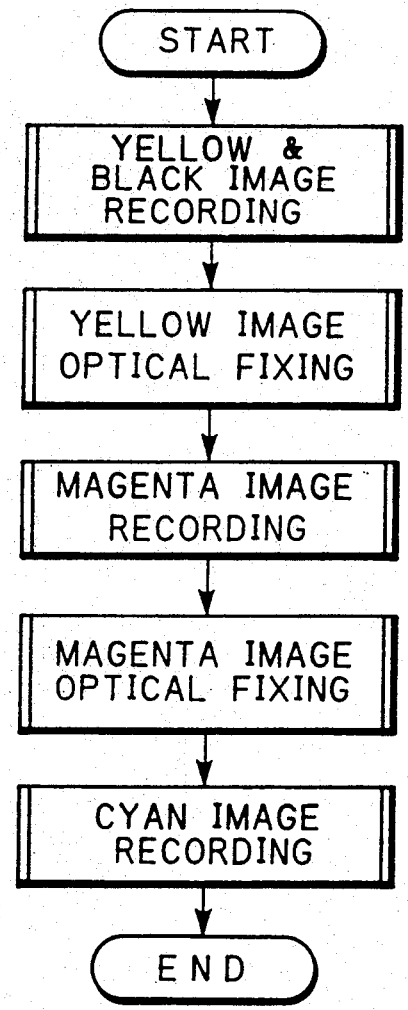
FIG. 7 is a flowchart illustrating the procedure of a thermal color printing according to a first embodiment of the present invention.

The yellow, magenta and cyan image line data are also sent to a black pixel discriminator 27, which discriminates the black pixels from other pixels. When all of the three image data of a pixel correspond approximately to maximum recording densities of the respective colors, the pixel is judged as a black pixel. As shown in the flowchart of FIG. 6, if the pixel at a position "i" of a line (i=a positive integer) is judged as a black pixel, a binary signal "Bi=1" is allocated to this pixel as the black image data. If the pixel at a position "i" is not a black pixel, a binary signal "Bi=0" is allocated to this pixel as the black image data. These black image data are written in a black line buffer memory 28.

A head controller 29 selectively reads out the black, yellow, magenta or cyan image line data from the black line buffer memory 28 or the three color line buffer memory 26, and sends the image line data to a drive pulse conversion look-up table memory 30 (hereinafter referred to as the drive pulse conversion LUT). The drive pulse conversion LUT 30 converts each pixel data of the image line data into a number of drive pulses by considering the coloring characteristics of the thermosensitive recording layer 15.

Figure 4:
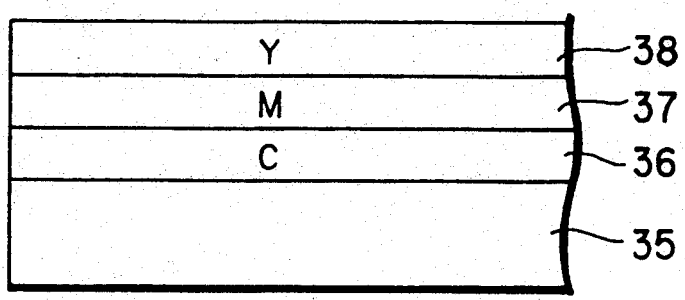
FIG. 4 is a partial section of a thermosensitive color recording medium, illustrating the laminated construction.

FIG. 4 shows an example of the thermosensitive color recording medium 15, wherein a cyan recording layer 36, a magenta recording layer 37 and a yellow recording layer 38 are laminated on a supporting material 35 in this order from the bottom. The supporting material 35 is an opaque coated paper or a plastic film. However, when an OHP (over-head projector) sheet is desired to be made, a transparent plastic film is used as the supporting material 35.

The cyan recording layer 36 contains an electron donating dye precursor and an electron accepting compound as main components, and is colored in cyan when a predetermined amount of heat energy per unit area is applied thereto. The magenta recording layer 37 contains a diazonium salt compound having a maximum absorption factor at a wave length of 360±20 nm and a coupler which acts upon the diazonium salt compound and is developed in magenta when it is heated. The magenta recording layer 37 loses its capacity of color-developing when it is exposed to electromagnetic rays of 360±20 nm, that is, ultraviolet rays, because the diazonium salt compound is photochemically decomposed by this range of rays. The yellow recording layer 38 contains a second diazonium salt compound having a maximum absorption factor at a wave length of 420±20 nm and a coupler which acts upon the second diazonium salt compound and is colored in yellow when it is heated. The yellow recording layer 38 also loses its color developability when it is exposed to electromagnetic rays of 420±20 nm, that is, near ultraviolet rays.

Figure 5:
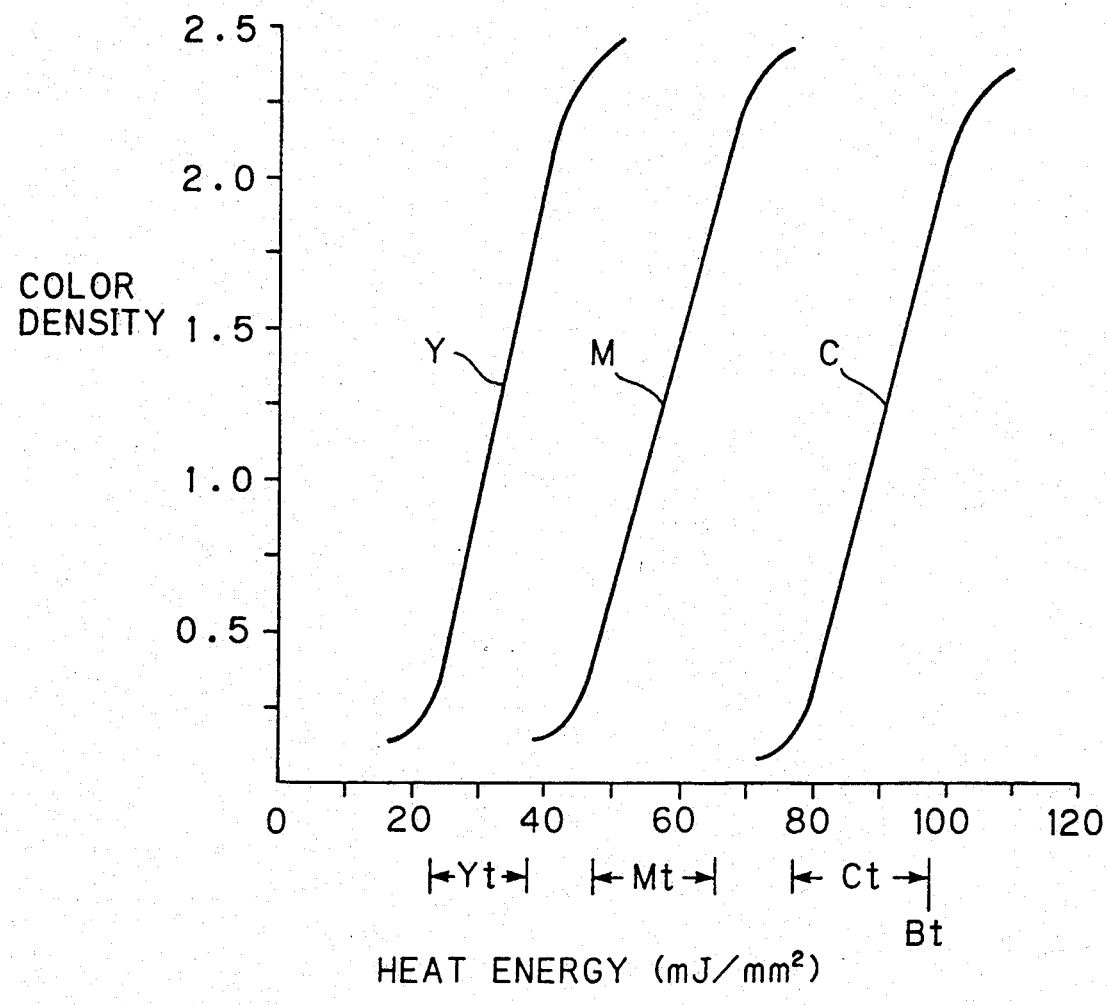
FIG. 5 is a graph showing the coloring characteristics of the thermosensitive color recording medium.

FIG. 5 illustrates the respective characteristic curves of the thermosensitive color recording layers 36 to 38. The horizontal axis indicates the amount of heat energy per unit area. Recording in the yellow recording layer 38 is performed by applying heat energy in a range Yt. Recording in the magenta recording layer 37 is performed by applying heat energy of a range Mt. Recording of the cyan recording layer 36 is performed by applying heat energy of a range Ct. Because there is scarcely any possibility that a heat energy of the range Ct or more is applied to the thermosensitive color recording medium 15 under an ordinary reserving condition, the cyan recording layer 36 is not provided with a capacity to be optically fixed. However, if necessary, it is possible to provide the cyan recording layer with such a capacity by adding a diazonium salt compound and a coupler which are fixed when exposed to light of another wave length range.

The operation of the above described direct thermal color printer will be described with respect to a case where a full-color image containing black characters is to be printed.

The controller 23 causes the motor 16 to rotate through the motor driver 18, so as to transport the thermosensitive color recording medium 15 placed on the platen drum 16 toward a print position where the thermal head 14 is disposed. Simultaneously, the controller 23 reads out blue, green and red image data of the first pixel of the first line from the frame memory unit 12. These image data are converted into yellow, magenta and cyan image data in the gradation control LUT 25 and, thereafter, are written correspondingly in the three color line buffer memory 26. The black pixel discriminator 27 determines whether all of the three color image data correspond to the respective maximum recording densities. If the answer is yes, the pixel is judged as a black pixel, and a binary "1" is written in a corresponding address of the black line buffer memory 28. If the answer is no, a binary "0" is written in the corresponding address of the black line buffer memory 28. Thereafter, three color image data of the second and following pixels are subjected to the same procedure as for the first pixel, until the three color image data of the "n"th pixel of the first line have been converted and written in the three color line buffer memory 26, and the black image data therefor has been written in the black line buffer memory 28.

Figure 8A:
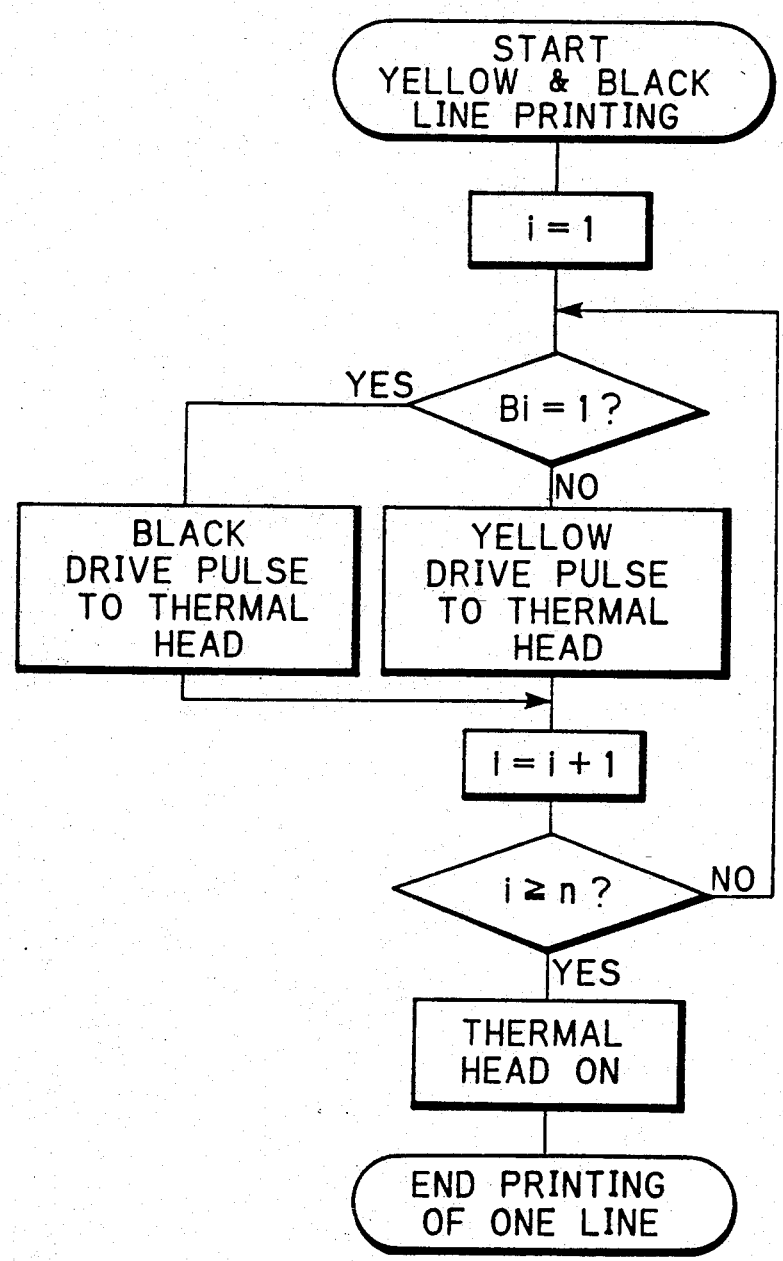
FIG. 8A is a flowchart illustrating the procedure of simultaneously recording yellow and black images in the first embodiment.

When the leading end of a recording area of the thermosensitive color recording medium 15 is moved into the print position, the thermal head 14 starts recording or printing a line of the yellow image concurrently with a line of the black pixels. As shown in FIG. 8(A), the head controller 29 determines whether the first pixel of the black image data written in the black line buffer memory 28 is "1" or "0". If the black image data is "1", this data is converted into a first predetermined number of drive pulses in the drive pulse conversion LUT 30. The first predetermined number of drive pulses correspond to a maximum amount of heat energy Bt to be radiated from the heating element, as shown in FIG. 5. If, one the other hand, the black image data is "0", the head controller 29 reads out the first pixel of the yellow image data from the three color line buffer memory 26, and sends the yellow image data to the drive pulse conversion LUT 30.

The drive pulse conversion LUT 30 outputs a number of drive pulses corresponding to an amount of heat energy which is necessary for recording a yellow dot at a desired density in accordance with the yellow image data, and which is within the yellow coloring range Yt as shown in FIG. 5.

In this way, either the black image data or the yellow image data are seriatim converted into drive pulses, with respect to the first to the last "n"th pixels of the first line, and are sent to the thermal head 14. When the drive pulses for a line of the image have been sent to the thermal head 14, the heating elements thereof are driven according to the number of drive pulses. Thereby, the heating element allocated to a yellow dot applies an amount of heat energy within the yellow coloring range Yt to the thermosensitive recording layer 15, so that the yellow recording layer 38 is colored to record the yellow dot at a desired density. Simultaneously, the heating elements allocated to black dot applies the maximum amount of heat energy Bt to the thermosensitive color recording medium 15, so that the yellow, magenta and cyan recording layers 38, 37 and 36 are simultaneously colored to record black dots on the thermosensitive color recording medium 15 by a subtractive mixture. Needless to say, those heating elements which should record neither yellow dots nor black dots are not driven.

During recording the first line of the yellow image and/or the first line of the black image, the second line of the three color image data B, G and R are read in the gradation control unit 13, wherein the above-described black pixel discrimination is performed after the conversion of these data into three color image data Y, M and C. Subsequently, the three color line buffer memory 26 and the black line buffer memory 28 are rewritten by the image data of the second line.

When the recording of the first line of the yellow and black images is completed, the platen drum 17 is rotated by a predetermined amount so as to shift the thermosensitive recording layer by one line, while the yellow image data and the black image data are selectively read out from the three color line buffer memory 26 and the black line buffer memory 28, respectively. Yellow dots and black dots of the second line are recorded in the same way as for the first line. Also the third to the last lines of the yellow and black images are recorded in the same way.

While the platen drum 17 is rotated to transport the thermosensitive color recording medium 15 for recording the yellow and black images, the part of the thermosensitive color recording medium 15, that has the yellow and black dots recorded thereon, is sequentially placed under the optical fixing device 20. The sharp cut filter 22 of the driver 20 cuts off a part of light projected from the ultraviolet lamp 21, such that light having a wave length range more than of about 410 nm only reaches to the thermosensitive color recording medium 15. Because the light of this range discomposes the diazonium salt compound in the yellow recording layer 38, the yellow recording layer 38 loses the capacity to develop color.

When the platen drum 17 rotates one revolution, the leading portion of the recording area of the thermosensitive color recording medium 15 again reaches the thermal head 14. Then, the recording of the magenta image is started. In order to record the magenta image, the first line of the three color image data are read out from the frame memory unit 12, sequentially from the first pixel to the last pixel, and are subjected to the gradation conversion, as in the above-described yellow image recording. The converted three color images are written in the three color line buffer memory 26. However, the black pixel discrimination is not performed, and hence the black line buffer memory 28 is not written.

As shown in FIG. 8(B), the magenta image data are read out by the head controller 29 from the three color line buffer memory 26, sequentially from the first pixel, to be converted into drive pulses. When the drive pulses for recording a line of the magenta image have been sent to the thermal head 14, the heating elements allocated to the magenta dots are driven to apply heat energy to the thermosensitive color recording medium 15 within the magenta coloring range Mt. When the recording of the first line of the magenta image is completed in this way, the thermosensitive color recording medium 15 is transported by the predetermined step. Thereafter, the second and following lines of the magenta image are recorded in the same way as for the first line. Although the magenta coloring heat energy range Mt is higher than the yellow coloring heat energy range Yt, the yellow recording layer 38 cannot be colored any more, because the yellow recording layer 38 has already been optically fixed.

During the recording of the magenta image, the sharp cut filter 22 of the optical fixing device 20 is displaced on the front of the ultraviolet lamp 21. Thereby, whole light from the ultraviolet lamp 21 illuminates the thermosensitive color recording medium 15 which is transported under the optical fixing device 20. Th magenta recording layer 37 is optically fixed by the ultraviolet rays of about 365 nm which is included in the light from the ultraviolet lamp 21.

According to the above described embodiment, the yellow image and the black characters are simultaneously recorded, so that the black characters can be clearly and distinctly recorded without the need for increasing the number of recording steps. Moreover, in the case of a black-white image, because only one step of recording is necessary, the speed of printing is improved.

However, the difference between the heat energy necessary for recording the yellow dots and the heat for recording the black dot is so large that the heat energy accumulated in the heating element, which is allocated to recording a black dot of a line, may affect the recording of a yellow dot in the next line, by applying too large an amount of heat energy. In such a case, the yellow dots affected by the accumulated heat energy would de deeper than the desired density, or could be colored in magenta, cyan or neutral.

Figure 9:
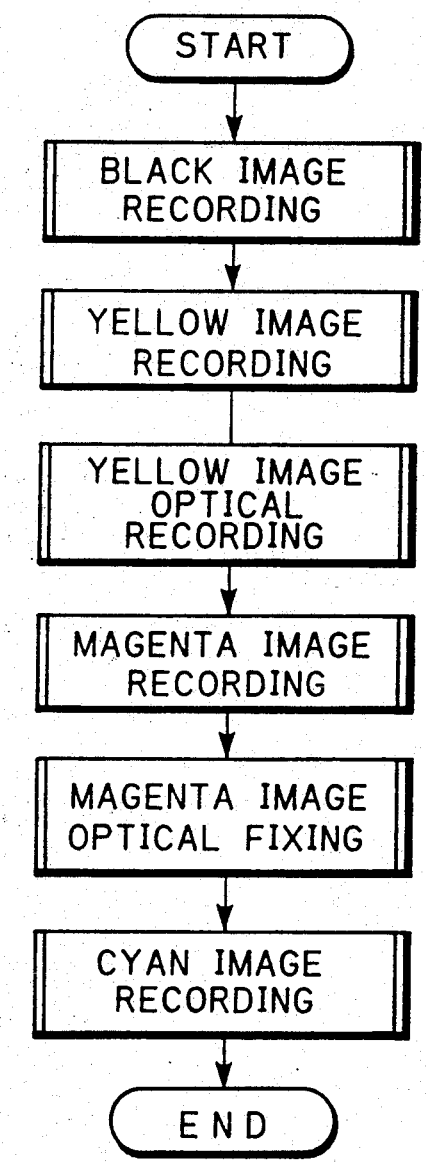
FIG. 9 is a flowchart illustrating a second embodiment of the present invention, wherein a black image is recorded first.

In order to prevent such an over-coloring, it is possible to perform the black image recording prior to the yellow image recording, as illustrated in FIG. 9. According to this embodiment, it becomes possible to avoid the over-coloring which is due to the heat energy accumulated in the heating elements that have been used for recording black dots of the preceding line. Consequently, it is possible to record black characters still more distinctly.

Although the present invention has been described with respect to the recording of a full-color image containing black characters, it is, of course, possible to apply the present invention to recording color images containing black images other than characters.

Furthermore, the present invention is applicable to serial printers wherein pixels are serially printed by a two-dimensional movement of the recording medium relative to the thermal head, although the above embodiments only relate to line printers wherein the recording medium is moved linearly relative to the thermal head.

Thus, the present invention is not intended to be limited by the above described embodiment but, on the contrary, various modifications of the present invention can be effected without departing from the spirit and scope of the appended claims.

What is claimed is:

1. A direct color thermal printing method for recording a full-color image on a thermosensitive color recording medium having at least first, second and third thermosensitive recording layers laminated on each other, which have different heat sensitivities from each other and are colored in first, second and third colors, respectively, said method comprising the steps of:
   A. discriminating pixels of the full-color image to be printed as black dots from other pixels of the full-color image; and
   B. recording said black dots using a predetermined maximum amount of heat energy for simultaneously coloring the first, second and third thermosensitive recording layers.

2. A direct color thermal printing method as recited in claim 1, wherein said discriminating step A comprises the steps of:
   detecting three color data of each of said pixels of the full-color image by three color separation; and
   determining one of said pixels to be printed as a black dot when a density level for each of said three color data of said one pixel are above a predetermined density level.

3. A direct color thermal printing method as recited in claim 2, wherein said discriminating step A further includes the step of storing black pixel data indicative of said pixels determined to be printed as black dots by each line, and wherein said recording step B further includes the step of driving an array of heating elements, extend in a primary scanning direction, in accordance with said black pixel data.

4. A direct color thermal printing method as recited in claim 3, wherein said thermosensitive color recording medium is transported in a subsidiary scanning direction which is perpendicular to said primary scanning direction.

5. A direct color thermal printing method as recited in claim 3, wherein said black pixel data is a binary signal, of which a higher level corresponds to a pixel to be printed as a black dot.

6. A direct color thermal printing method as recited in claim 1, further comprising the step of:
   C. recording said other pixels by sequentially recording first, second and third color frames of the full-color image in the first, second and third thermosensitive recording layers by using first, second and third ranges of heat energy which are different from each other and are less than said predetermined maximum amount of heat energy, said first range having the lowest range of heat energy and said third range having the highest amount of heat energy.

7. A direct color thermal printing method as recited in claim 6, further comprising the steps of:
   D. applying heat energy in said first range of heat energy to said thermosensitive color recording medium, so as to record said first color frame in said first thermosensitive recording layer which has the highest heat sensitivety;
   E. exposing, thereafter, said thermosensitive color recording medium to electromagnetic rays of a first predetermined wavelength for fixing said first thermosensitive recording layer;
   F. applying, thereafter, heat energy in said second range of heat energy to said thermosensitive color recording medium, so as to record said second color frame in said second thermosensitive recording layer which has a lower heat sensitivety than the heat sensitivity for said first thermosensitive recording layer;
   G. exposing, thereafter, said thermosensitive color recording medium to electromagnetic rays of a second predetermined wavelength for fixing said second thermosensitive recording layer; and
   H. applying, thereafter, heat energy in said third range of heat energy to said thermosensitive color recording medium, so as to record said third color frame in said third thermosensitive recording layer which has a lower heat sensitivety than the heat sensitivity for said second thermosensitive recording layer.

8. A direct color thermal printing method as recited in claim 7, wherein said recording step B is performed before said recording step C.

9. A direct color thermal printing method as recited in claim 7, wherein said recording step B is performed concurrently with said recording step C.

10. A direct color thermal printing method as recited in claim 9, further comprising the steps of:
   I. detecting data for said first, second and third colors from each of said pixels;
   J. determining a pixel to be printed as a black dot when a density level for each of said three color data of said pixel are above a predetermined density level;
   K. storing black pixel data indicative of said pixels determined to be printed as black dots by each line in a first line buffer memory;
   L. storing at least data for said first color of said three color data by each line in a second line buffer memory;

M. reading out said black pixel data from said first line buffer memory so as to allocate first drive signals to a first corresponding part of said heating elements;

N. reading out said first color data from said second line buffer memory so as to allocate second drive signals to second corresponding part of said heating elements respectively; and O. driving said heating elements simultaneously in accordance with said first or second drive signals.

11. A direct color thermal printing method as recited in claim 10, wherein the value of said first drive signal corresponds to said maximum amount of heat energy, whereas the value of said second drive signal is variable within a predetermined range corresponding to said first range of heat energy.

12. A thermal printing apparatus for recording a full-color image and black characters including a plurality of pixels comprising:

a thermosensitive color recording medium having at least first, second and third thermosensitive recording layers laminated on each other in a predetermined order wherein said first thermosensitive recording layer corresponds to a top layer, said second thermosensitive recording layer corresponds to a middle layer and said third thermosensitive recording layer corresponds to a bottom layer, which are colored in first, second and third colors respectively for recording the full-color image and the black characters thereon;

a thermal head having an array of heating elements extending in a primary scanning direction, for recording first, second and third color frames of said full-color image in said first, second and third thermosensitive recording layers respectively;

scanning means for moving said thermosensitive color recording medium in a subsidiary direction which is perpendicular to said primary scanning direction;

discriminating means for discriminating pixels of the full-color image to be printed as black dots from other pixels of the full-color image;

first recording means for recording said black dots by driving said thermal head to apply a predetermined maximum amount of heat energy to said thermosensitive color recording medium, for simultaneously coloring said first, second and third thermosensitive recording layers; and second recording means for recording said other pixels of the full-color image by driving said thermal head to sequentially apply first, second and third ranges of heat energy to said thermosensitive color recording medium, for sequentially coloring said first, second and third thermosensitive recording layers in said predetermined order, said first range having the lowest range of heat energy and said third range having the highest range of heat energy.

13. A thermal printing apparatus as recited in claim 12, further comprising:

first optical fixing means for generating electromagnetic rays of a first wave length range for optically fixing said first thermosensitive recording layer; and second optical fixing means for generating electromagnetic rays of a second wave length range for optically fixing said second thermosensitive recording layer.

14. A thermal printing apparatus as recited in claim 13, wherein said discriminating means comprises:

detecting means for detecting three color data of each of the plurality of pixels of the full-color image by three color separation;

determining means for determining a pixel to be printed as a black dot when a density level for each of said three color data of said pixel are above a predetermined density level; and a first line buffer memory for storing black pixel data indicative of a plurality of pixels determined to be printed as black dots by each line which extends in said primary scanning direction;

said first recording means drives said heating elements of said thermal head in accordance with said black pixel data.

15. A thermal printing apparatus as recited in claim 14, wherein said black pixel data is a binary signal, of which a higher level corresponds to a pixel to be printed as a black dot.

16. A thermal printing apparatus as recited in claim 15, wherein said first recording means performs recording before said second recording means performs coloring of said first thermosensitive recording layer which has a heat sensitivity higher than the heat sensitivity of said second and third thermosensitive recording layers.

17. A thermal printing apparatus as recited in claim 15, wherein said first recording means performs recording while said second recording means performs coloring of said first thermosensitive recording layer which has a heat sensitivity higher than the heat sensitivities of said second and third thermosensitive recording layers.

18. A thermal printing apparatus as recited in claim 17, further comprising:

a second line buffer memory for storing at least first color data of said three color data by each line which extends in said primary scanning direction; and reading means for reading out said first line buffer memory or said second line buffer memory and allocating either said black pixel data or said first color data to each of said heating elements;

said first and second recording means are simultaneously activated to drive said heating elements in accordance with said first color data and said black pixel data, each time a line of said first color data and a line of said black pixel data have been allocated to said heating elements.

* * * * *